May 11, 1954     F. C. WHEELER     2,678,207
MOBILE LIFTING TRUCK

Filed July 14, 1952     4 Sheets-Sheet 1

FIG. I.

Inventor
Frank Charles Wheeler
By Cushman, Darby & Cushman
Attorneys

May 11, 1954     F. C. WHEELER     2,678,207
MOBILE LIFTING TRUCK
Filed July 14, 1952     4 Sheets-Sheet 4
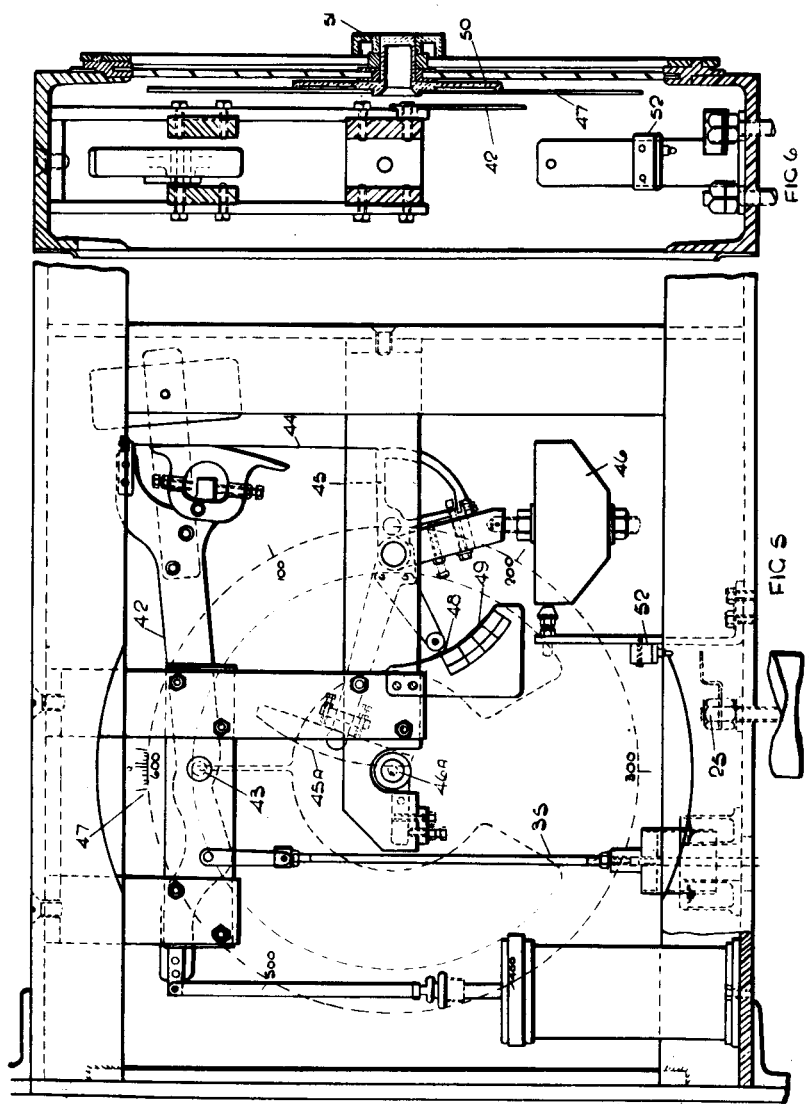
Inventor
Frank Charles Wheeler
By Cushman, Darby & Cushman
Attorneys Patented May 11, 1954

2,678,207

UNITED STATES PATENT OFFICE 2,678,207

MOBILE LIFTING TRUCK

Frank C. Wheeler, Heaton, Bradford, England, assignor to Wheeler Smith Limited, Liverpool, England Application July 14, 1952, Serial No. 298,870

4 Claims. (Cl. 265—41)

This invention relates to means for increasing the utility of mobile lifting trucks whereby precision weighting equipment can be incorporated into the construction in such a manner that the load it has to handle can be quickly and accurately weighed, and the said weights totalled up if necessary.

This type of lifting truck is usually mechanically or electrically propelled and is provided at the forward end with large forks or a platform for lifting loads and raising them to a desired height for loading on to another vehicle or for stacking purposes. Usually, the truck is arranged with a pair of masts which have guided against their interior surfaces a carriage and roller device with chains or cables for raising the forks. The power employed for this lifting operation is supplied by the power unit of the truck itself and it usually consists of a hydraulic cylinder with a piston raised or lowered by fluid fed by a pump driven by the power unit of the truck, which may be an internal combustion engine, or an electric battery system.

Various devices have been proposed whereby the tension in the lifting chains and cables could be measured by inserting between the attachment points and the ends of the cables or chains a suitable device, which might consist of a number of springs with a recording device for measuring this tension, and provided with a chart or scale which converts this tension measurement into terms of weight.

Similar means of tension measurement calibrated in terms of weight have also been proposed by using a hydraulic or pneumatic diaphragm connected to a Bourdon tube with a pointer indicating against a scale calibrated in weight units.

These tension measurements can of necessity be only an approximation to the weight that is on the forks, as the reading is very much influenced by the unavoidable friction between the rollers and the masts, the pulleys and so on, and also by the position of the load on the forks. The weight indication given is by no means accurate enough for modern trading conditions when handling consignments of valuable commodities such as sugar, flour, tobacco and such like, which need highly sensitive weighing equipment.

The friction with these devices, however slight, is a variable quantity and unfortunately, is highly magnified by the weight indicator mechanism and being by no means a constant factor, it can cause serious inaccuracies.

One object of the present invention is to provide for a lift truck an improved form of weighing mechanism and also an improved construction of such trucks which will enable the weighing to a high degree of accuracy of any load the truck may be capable of handling. A further object is to enable the weight indicating mechanism to be relieved of the strain of the supported load when it is not required to be in action, as when the truck is in motion. Still further objects are to enable the weighing equipment to operate accurately when the truck is not on level ground, and also to enable the weight of pallets or stillages to be tared off so that the indicator can show actual net weights.

According to the invention there is provided a mobile lifting truck wherein the load-engaging member, the guides and supports therefor and the means for raising and lowering said member are formed as a unitary assembly which normally is supported directly upon the chassis or framework, and in which weighing mechanism is provided, and means whereby said weighing mechanism can be interposed at will between the said chassis or framework and the unitary assembly, for measuring the weight on the load-engaging member. Thus for normal operation of the truck in raising and transporting loads the weighing mechanism is inoperative, but can be brought into use at any time to weigh the load carried by the load-engaging member.

Means may be provided for effecting relative movement between the weighing machanism and the unitary assembly so as to disengage the latter from its normal direct support on the chassis, and cause it to be carried entirely by the weighing mechanism.

A convenient embodiment of the invention will now be described with particular reference to the accompanying sheets of drawings which illustrate the invention for application to a fork lift type of truck.

Figure 4 is a section view of the reactor stays at the top of the equipment for dealing with the couple forces set up by the cantilever loading of goods on the forks.

Figure 5 is a front elevation of a special type of visible weight indicator suited to the limited space available on the truck for this fitment.

Figure 6 is an end section through Figure 5 to show the rotatable reading scale.

In the drawings like numerals of reference indicate similar parts in the several views.

Figure 1:
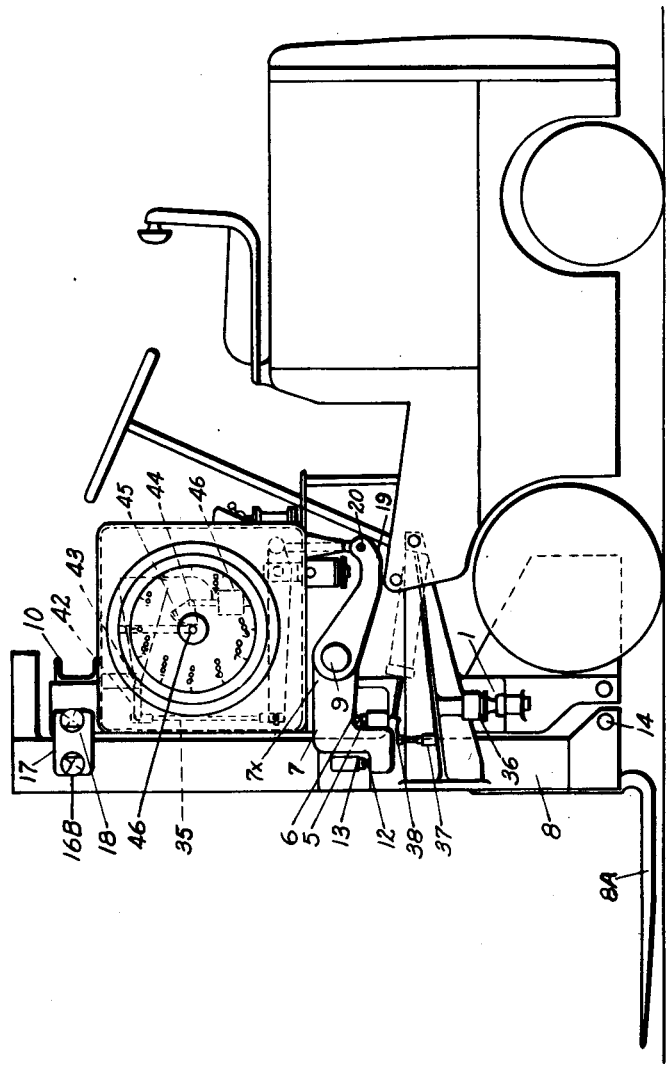
Figure 1 is a side elevation of a typical fork lift truck with the weighing equipment incorporated and with the weight indicator arranged to read from the side of the truck.
Figure 2:
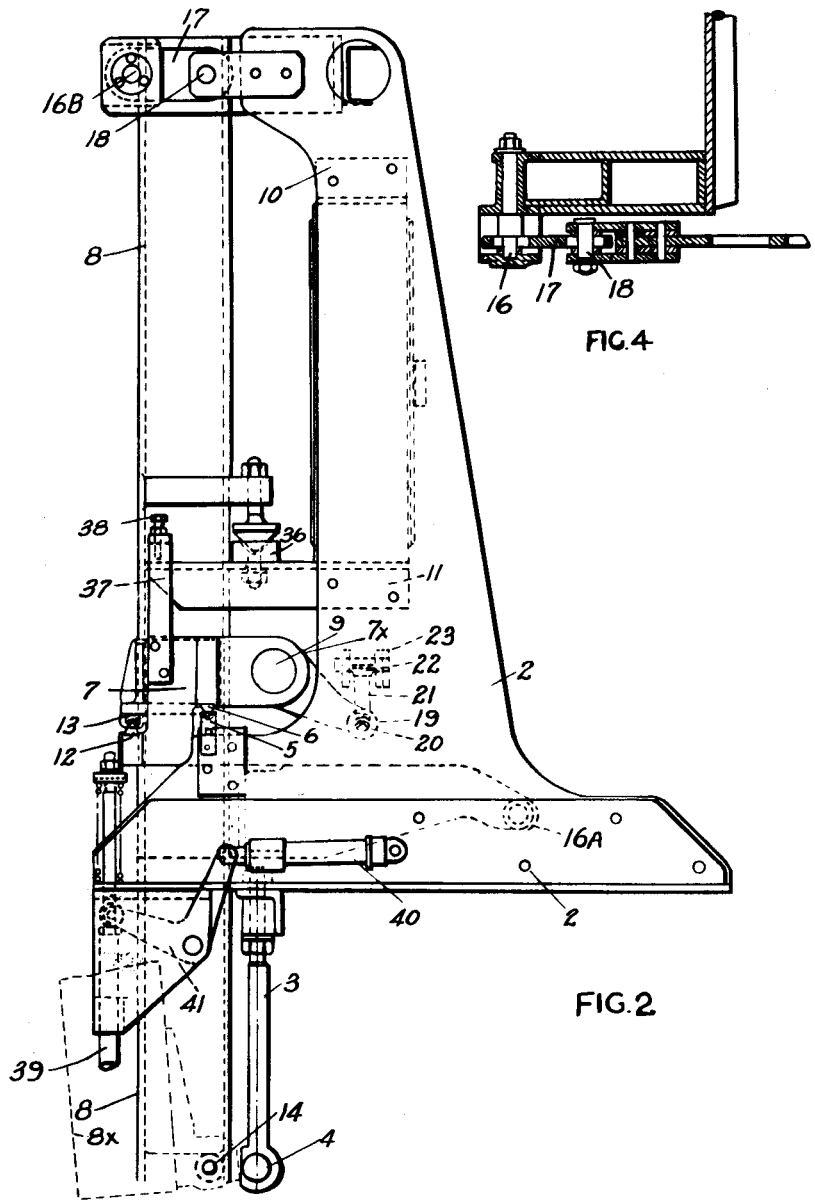
Figure 2 is a side elevation of the assembled weighing equipment of the present invention ready for attachment to the truck, the weight indicator being fixed across the truck not at the side as in Figure 1.

Referring to the drawings a stand or framework 2 is rigidly attached to each side of the truck frame. In Figure 2 its rigidity is further maintained by means of two rods 3 carried down on to the axle at 4 from which the masts of the truck (without weighing equipment) were usually hinged. This framework 2 carries on each side at 5 a knife edge seating on to which the fulcrum knife edge 6 of the main weighing lever 7 rests. This main weighing lever 7 embraces the load masts 8 of the truck which load masts 8 will be described later, and each of the side arms 7x of this lever 7 are joined together by the circular shaft at 9. The side frames 2 are also joined together by the cross members 10 and 11 which carry the weight indicator mechanism indicated in dotted lines in Figure 2 when it is required to be read from the driver's seat instead of on the side as shown in Figure 1. At the front ends of each of the main lever side arms 7 are knife edges 12 which are to receive the weight imposed by the unitary assembly comprising the load masts 8 which constitute supports, the tilting masts 8x and the forks 8a (Figure 1) guided thereon and all associated fitments. The load masts 8 carry at their lower ends a shaft 14 on to which the tilting mast 8x of the truck with it forks, lifting cylinders etc. (not shown), is now hinged instead of on the shaft 4, which hitherto carried the tilting mast on a standard non-weighing type of truck.

Joining the two load masts 8 is a cross frame 15 which also incorporates two pairs of brackets 16 which in their turn provide anchorage 16a for the usual hydraulic cylinders for the tilting mast 8x, which cylinders on a standard non-weighing truck are anchored to fixed points on the truck chassis. The top of the load mast structure carries pivots 16b for links 17, one at each side which at their other extremities fit around pivots 18 which are part of the side frame 2. The bearing of the links 17 and the pivots 16b and 18 could be ball races or could be knife edge seatings with the pivots 16b and 18 arranged as knife edges in accordance with standard practice in normal weighing scales and familiar to those versed in the scale makers art.

Figure 3:
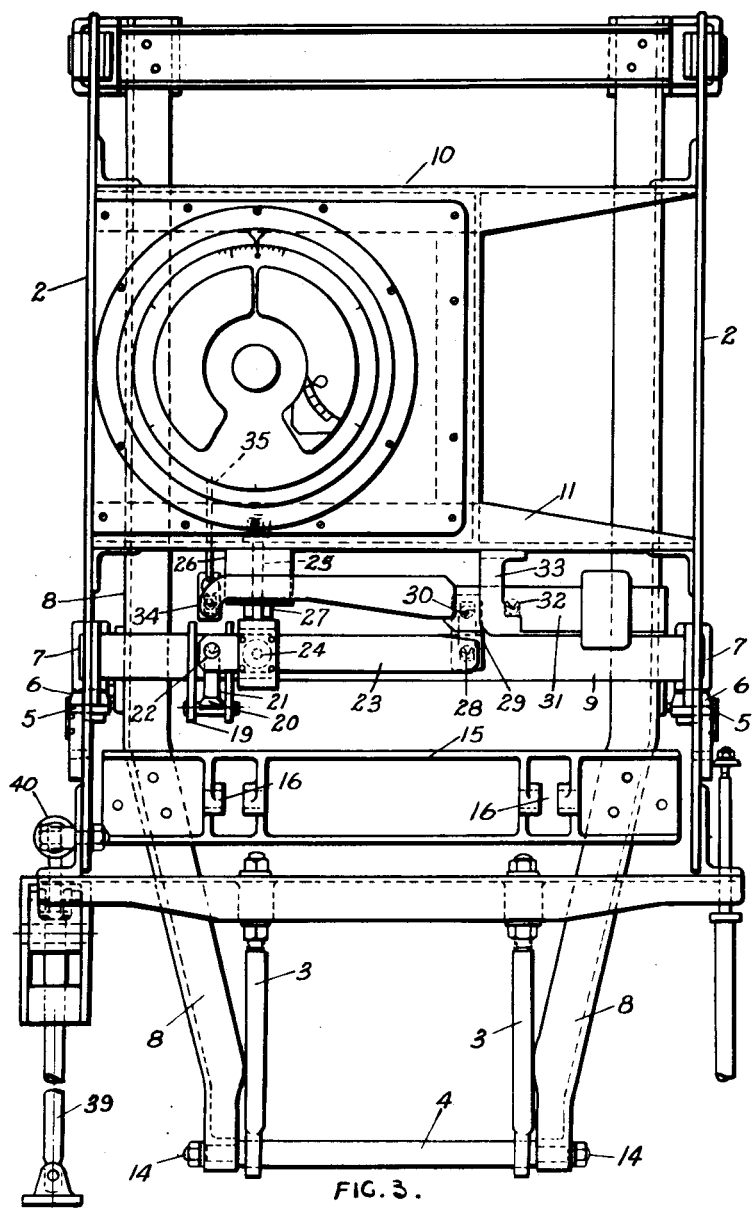
Figure 3 is an elevation as seen from the driver's seat of the weighing equipment shown in Figure 2.

Lines joining from knife edges 12 to pivots 16b and from knife edges 6 and pivots 18 must be parallel to form a parallelogram with the distance between the knife edges 12 and 6. The main lever arms 7x joined by the circular shaft 9 have a twin arm 19 which carries a knife edge centre 20 exerting an upward pressure on a connection 21 which has knife edge seatings 22 at the top and bottom and transfers the load received by the main lever 7 to the knife edge centre of the lever 23. This lever 23 is fulcrumed in a housing 24 (see Figure 3) which is guided by rods 25 passing through the hydraulic cylinder 26 secured to the main cross frame structure 11 and as shown in Figure 3 the piston 27 has been forced down by the fluid in the cylinder 26 and the lever 23 and all other load bearing levers are held in the position required for weighing. At the extremity of the lever 23 is a knife edge centre 28 which exerts a downward pull of the link 29 transferring its load to the knife edge centre 30 of the lever 31 which is fulcrumed at 32 from the fixed bracket 33. At the other end of the lever 31 is a knife edge centre 34 pulling down the connecting rod 35 of the dial indicator mechanism described later.

As explained, the drawing shows the position of the weighing levers in the position they occupy for the weighing operation, being maintained thus by the downward pressure of the piston 27 of the hydraulic cylinder 26. This positioning is only maintained when hand or foot pressure is applied to the spring loaded valve (not shown) feeding the cylinder 26 from the hydraulic system of the truck. When the cylinder is uncharged, the force exerted by the weight of the load masts 8 and their fitments exert a considerable downward pressure of the knife edges 12 of the main lever arms 7, forcing the lever 23 and its fulcrum housing upwards against stops (not shown) on the rods 25. This then is the non-weighing position and in order to protect the knife edge centers and seating when the truck is in this non-weighing condition, the load mast structure 8 with its fitments is lowered into the conical seatings 36 (see Figure 2) with the seatings 13 held clear of the knife edge centres 12 of the main lever 7. When the lever system is brought back to this non-weighing condition it will be seen that the upward movement of the fulcrum housing 24 causes the connection 21 to move upward and thus making the load centres 12 to move downwards clear of their seatings 13, so that the load mast structure 8 comes to rest supported in the cone seatings at 36. Attached to the main lever arms 7 are brackets 37 which fall with the lever arms 7 and adjustable screws 38 at the top of the bracket come into contact with the extended ends of the cross frame 11 which causes the main lever arms 7 to rock and lift the knife edges 6 out of engagement with the seatings 5. It will, therefore, be seen that except when required for the weighing operation, the knife edge bearings of the lever 7 are all out of contact and unburdened and all weight of the masts, forks and any load thereon is rigidly carried on the cone seating 36 and the truck can be used normally without transmitting shocks or continuous wearing loads in the knife edge bearings, which it is essential be kept in that precision condition if accurate weighing is to be maintained.

In order that the truck shall be kept rigid during the weighing operation and thus give steady pointer reading and cope with conditions that might be caused by unequal loadings of the forks, and if one of the tires is much more inflated than the other, or the truck springing is unequal, a pair of stabilizing jacks 39 is provided; these consist of spring loaded rods suitably guided and operated by hydraulic cylinders 40 anchored to the main frame 1 which exert downward pressure on the spring loaded jacks 39 through the bell-crank levers 41. When the spring loaded control valve previously mentioned is operated a supply of fluid is fed simultaneously to the cylinder 26, positioning the weighing levers for weighing and also to the cylinders 40 which stabilise the truck. The weight of the load on the forks is then instantly shown on the dial indicator, it being understood that the dead weight of the masts, forks, etc. are balanced off in the usual manner familiar to those versed in the craft of weighing machine making. When the pressure is relieved from the control valve, the jacks 39 rise and the levers all return to the non-weighing position with all weight carried on the cone seatings 36.

Referring to the dial indicator shown in Figure 5, it will be realised that due to the very limited space available on a standard fork lift truck a large dial is not possible, yet for precision weighing to fine limits a large number of divisions is essential, therefore the dial indicator has been designed in the manner described later so that the pointer makes four revolutions from the zero mark to its full capacity. In the example shown the dial reads up to 2,400 lbs., and a pointer movement of approximately $\tfrac{3}{16}$ represents an amount of 2 lbs. with the reading scale only 16" diameter.

The connection rod 35 having received its load from the knife edge 34 of the lever 31 shown in Figure 3 transfers its load to the lever 42 fulcrumed at 43 and thence by means of the ribbon 44 to the cam 45 which is integral with the pendulum resistant 46 and the segmental gear 45$^a$ which drives the spindle 46$^a$ which carries the indicating pointer (not shown) reading against the engine divided scale of marks 47. For the full angular movement of the pendulum resistant 46 from zero to full capacity, the pointer spindle makes four complete revolutions and each revolution in the example shown is equal to a load of 600 lbs., and the scale of marks reads 0 to 600 lbs. Moving with the pendulum resistant is an index pointer 48 which moves along a fixed scale 49 bearing the legend "add to dial pointer reading" and after the dial pointer has made one revolution the index pointer 49 will indicate an amount of 600 lbs., which is to be added to the dial pointer reading. After two revolutions 1,200 lbs. to be added and after three revolutions 1,800 lbs. to be added.

The reading scale 47 is mounted on a boss 50 which passes through a hole in the glass front of the dial to allow the reading scale to be rotated to any desired position by means of the knob 51. If the truck is on sloping ground it will take up an angular position relatively to the pendulum 46 different from that which it would take up on level site and consequently the pointer will give an incorrect reading.

In order to rectify this all that is necessary is to rotate the reading scale 47 by means of the knob 51 so that the zero mark on the scale again coincides with the pointer, therefore it is not necessary to have a perfectly level site even though a pendulum resistant is used to counter balance the load. Note the resistance to the load could be a spring or springs, but these would not give the real sensitivity of weighing desired, particularly when weighing valuable commodities.

The rotatable mounting of the reading scale is also useful for taring off the weight of any pallet or fitment used on the forks thus leaving the pointer to indicate actual net loads.

At 52 is a switch normally on. Its purpose is to illuminate the dial so that it can be read in dark places. When the rods 25 which move with the housing 24 (see Figure 3) move upward to the non-weighing condition, the contact 52 is broken.

I claim:

1. In combination with a lift truck, a fixed frame on said truck, a load bearing mechanism including a main weighing lever having spaced connected arms, said arms having knife edge connections with opposite sides of said fixed frame, a movable load supporting frame, means pivotally connecting the movable frame to the fixed frame, said movable frame having knife edge connections with the arms of said main lever, a beam lever, means operatively connecting the main lever to the beam lever, an auxiliary lever, means providing a knife edge connection of the auxiliary lever with the fixed frame, means operatively connecting the beam lever to the auxiliary lever, weighing mechanism having a dial indicator mounted on the fixed frame, means operatively connecting the auxiliary lever to the dial indicator, supporting means on the truck for supporting the movable frame to relieve the weighing mechanism of the stress of supporting the load when the movable frame is in its non-weighing position, and means for raising the movable frame away from said supporting means to transfer the load to the weighing mechanism.

2. In combination with a lift truck, a fixed frame on said truck, said frame having spaced rear knife edge seats on opposite sides thereof, a load bearing mechanism including a main weighing lever having spaced connected arms provided with front knife edge seats, said arms having knife edges resting on said rear seats, a movable load supporting frame, means pivotally connecting the movable frame to the fixed frame, said movable frame having knife edges engaging said front seats, a beam lever pivotally connected to the fixed frame, means operatively connecting the main lever to the beam lever, an auxiliary lever pivotally connected to the fixed frame, means operatively connecting the beam lever to the auxiliary lever, a weighing mechanism having a dial indicator operatively connected to said auxiliary lever, supporting means on the truck for normally supporting the movable frame so as to relieve the weighing mechanism of the stress of the supporting load when the movable frame is in its non-weighing position, and means for raising the movable frame away from said supporting means so as to transfer the load to the weighing mechanism so that the load is carried entirely by the weighing mechanism.

3. In combination with a lift truck as called for in claim 1 in which said weighing mechanism includes a fixed scale, a rotary spindle having a dial indicator arranged to make more than one revolution relative to the scale from its zero mark to its full load capacity, a scale lever pivotally mounted on the fixed frame, ponderous means pivotally mounted on the fixed frame and operatively connected to said scale lever, means operatively connecting said ponderous means to said spindle, a fixed auxiliary scale, and said ponderous means having a pointer movable relative to said auxiliary scale to indicate the number of revolutions the spindle makes.

4. In combination with a lift truck as called for in claim 1 in which adjustable means are connected to the fixed frame and are arranged to engage the ground to maintain the truck in a stabilizing position during the weighing operation.

References Cited in the file of this patent

UNITED STATES PATENTS

| Number | Name | Date |
|---|---|---|
| 1,532,835 | Schlobach | Apr. 7, 1925 |
| 1,667,603 | Peccaud | Apr. 24, 1928 |
| 1,680,192 | Zucker | Aug. 7, 1928 |
| 2,444,835 | Le Tourneau | July 6, 1948 |
| 2,553,156 | Woodward | May 15, 1951 |